Oct. 29, 1968   J. L. BARKER ET AL   3,408,648
SPEED SENSOR
Filed Dec. 2, 1966   3 Sheets-Sheet 1

INVENTORS
JOHN L. BARKER
CHARLES L. DU VIVIER
JOHN R. ODION
BERNARD J. MIDLOCK

BY James N. Dresser
ATTORNEY

United States Patent Office 3,408,648
Patented Oct. 29, 1968

3,408,648
SPEED SENSOR
John L. Barker, Norwalk, Charles L. Du Vivier, Darien, John R. Odion, Wilton, and Bernard J. Midlock, Norwalk, Conn., assignors to Laboratory for Electronics, Inc., Waltham, Mass., a corporation of Delaware
Filed Dec. 2, 1966, Ser. No. 598,748
16 Claims. (Cl. 343—8)

ABSTRACT OF THE DISCLOSURE

A speed sensor adapted for use with a Doppler radar detection device of the type which produces a Doppler signal including a low-frequency portion, indicative of the detection of a passing vehicle, and a high-frequency portion, indicative of the speed of the passing vehicle. The Doppler signal is divided into its two portions, and the high-frequency speed portion is blocked until the low-frequency detection portion has terminated. The speed portion is then received while the vehicle travels a known distance. The length of time required for the vehicle to travel this distance is a measure of the vehicle speed.

Background of the invention

This invention relates to a speed measuring circuit. More particularly this invention relates to a circuit for accurately measuring over a wide range the speed of a moving vehicle from the Doppler frequency waves found in radar or microwave energy reflected from the vehicle.

Control of modern highways and city streets requires continuous availability of information about the traffic flow on the highway. Specifically information concerning the volume or density of vehicles and the speed of the vehicles is essential to efficient control of traffic. Such information enables control of the operating cycle of traffic control signals to alleviate congestion. A series of such control signals, located at various intervals along the highway, either at intersections or otherwise, can then be synchronized to operate in a timed sequence that permits efficient traffic flow over a long stretch of highway or street, and thereby reduces or eliminates traffic congestion. Additionally, lane controls can be utilized on modern highways to permit one or more lanes of a multi-lane highway to be used for traffic in one direction during peak periods of traffic flow in that direction and to be used for traffic in the opposite direction during periods when that traffic flow is at its peak.

Proper sequencing of traffic intersection signals and traffic lane control signals requires the availability of information about the volume of passing vehicles and about the speed of the passing vehicles. From this information, traffic density can be determined, and possible areas of congestion can be anticipated, thereby permitting the operation of traffic control signals in such a manner that the congestion is eliminated.

In large cities of the present day, such vehicle detection and speed information must be provided with a high degree of accuracy, particularly during peak traffic conditions. In such cities the traffic can become extremely congested during periods of peak traffic flow in corrective measures are not taken. Numerous means of detecting of the presence and measuring the speed of passing vehicles have been developed. Treadle operated detectors, magnetic detectors, or inductive detectors can be placed in the surface of the roadway so that they are operated as the vehicles go over them. Placement of two such detectors a known distance apart in the roadway can permit determination of vehicle speed. However, use of such devices requires that the roadway be dug up when the detector is inserted into the roadway. This disrupts traffic and is hazardous to the workmen involved. Should experience show the locations of the detectors are improper, movement of them requires another digging into the surface of the roadway, thereby interrupting traffic a second time. When the roadway is resurfaced, such detectors must be specially treated, adding to the time required for the resurfacing. Consequently, it is desirable to utilize as the input detector a device which is over the roadway and does not necessitate insertion into or under the surface of the roadway with the inherent expense and disruption of traffic.

Radar detection devices have recently been developed for use in vehicle detection and speed measurement. One such system utilizing a radar device is described in U.S. Patent 2,965,893 issued to J. L. Barker, Dec. 20, 1960, and assigned to the same assignee as the present invention. While the device and circuit disclosed in the aforementioned patent permit detection of passing vehicles and measurement of their speed accurate over certain speed ranges, many applications require more accurate information. Among other factors, accuracy of speed measurement can be affected by vehicle speed, vehicle length and height, and vehicle spacing. Super-highways between cities and expressways within cities frequently have traffic traveling at speeds as high as 70 miles per hour or greater. However, during periods of extreme congestion, especially within cities, traffic might be moving at less than 10 miles per hour. Thus a wide speed range exists over which a speed measuring device must be accurate. Additionally, the spacing between consecutive vehicles on a roadway may vary, particularly within cities. In slow to medium speed traffic, the spacing between consecutive vehicles might be quite small, while in faster traffic it can be considerably greater. It is necessary that the vehicle detection and speed measurement system be able to distinguish between consecutive vehicles, so that a separate reading will be obtained for each one, rather than a single reading resulting from the combined input from the two vehicles. Additionally, the size of vehicles varies greatly. Large trucks and buses are several times the size of small, compact cars, and larger cars have sizes between these two. An accurate detection and speed measurement system must be able to distinguish one large vehicle from two closely-spaced small vehicles.

Efficient traffic control requires that each lane of a multi-lane roadway be separately monitored to permit lane control on an individual lane basis. Then, for example, traffic can be diverted from a more congested lane to a less congested one, or left turn traffic can be effectively controlled. Thus, the traffic monitoring and speed measurement system must be capable of monitoring traffic in a single lane of a multi-lane roadway.

Summary of the invention

The present invention is a speed sensor capable of accurately detecting passing vehicles and measuring their speed over a wide range of speeds, within a single traffic lane of a multi-lane roadway, regardless of the vehicle spacing or size. In the present invention, the Doppler frequency signals, which are obtained from a radar or other ultra-high-frequency wave propagation detection device, are divided into a low frequency detection signal and a high-frequency speed signal. The detection signal is filtered and converted to a pulse. When this pulse ends, a switching means is caused to assume a first state. This enables gating circuitry to pass the high-frequency speed signal to a pulse-forming means which produces one output pulse for each input Doppler pulse in the speed signal. These output pulses have a magnitude and a duration dependent solely upon the characteristics of the pulse-forming means, and they have a pulse-repetition rate dependent upon the Doppler frequency of the speed signal. These output pulses are then applied to a voltage-level-generating means, the output of which is utilized as the input to a trigger means which generates two pulses. The first of these occurs at a low voltage level to initiate the circuit output signal. The second pulse occurs at a fixed voltage greater than the first, and resets the entire circuit.

In one preferred embodiment, two Schmitt trigger circuits are used as the trigger means, and a mono-stable multivibrator or one-shot is used as the pulse-forming means. The voltage difference between the firing levels of the two Schmitt triggers is constant, and a known number of one-shot output pulses are required to increase the voltage-level-generating means output from the firing level of the first Schmitt trigger to the firing level of the second. Consequently, a known number of Doppler pulses occurs during the time the first Schmitt trigger is turned on to create the circuit output signal. This means that the passing vehicle has traveled a known distance during the time the circuit output signal is present, and so the duration of the output signal is inversely proportional to the speed of the passing vehicle.

To improve the accuracy of the system under general operating conditions, clamping circuits can be included. The first prevents actuation of the circuit by the high-frequency Doppler signals received in the back-lobes of the input detection device as a vehicle approaches. A second clamp circuit insures that each speed measurement is made at approximately the same distance from the detection device, regardless of vehicle speed or length. Another clamp circuit insures that a second, closely-following vehicle will not be missed by the speed measuring circuitry. A second output can be obtained indicative of the detection of the passing vehicle, or the occurrence of the speed-measuring pulse can indicate the detection of a vehicle.

It is accordingly an object of the present invention to provide an improved traffic monitoring system capable of generating highly accurate vehicle detection and speed measurement signals.

It is another object of the present invention to provide a vehicle detection and speed measurement system which is adapted for use with an ultra-high-frequency wave propagation detection device and which has a high degree of accuracy over an extremely high range of vehicle speeds.

It is a further object of the present invention to provide an improved vehicle detection and speed measurement system which includes an ultra-high-frequency wave propagation detection device and which is accurate over a wide range of speeds while being capable of distinguishing between closely-spaced consecutive vehicles.

It is a still further object of the present invention to provide an improved vehicle detection and speed measurement system which includes means to insure that separate output indications are generated for each of two or more closely-spaced high speed vehicles regardless of vehicle size.

It is an additional object to provide an accurate vehicle detection and speed measurement system capable of monitoring traffic on a single lane of a multi-lane roadway without being actuated by traffic on adjacent lanes.

It is an additional object of the present invention to provide a vehicle detection and speed measurement system capable of generating signals which can be utilized to control the operation of traffic intersection signals and lane control signals on streets and super-highways.

These and other objects and advantages will be apparent in the subject invention from the following detailed description and claims, when taken in conjunction with the accompanying drawings in which like parts are designated by like numerals.

Description of the preferred embodiment

Figures 1, 2:
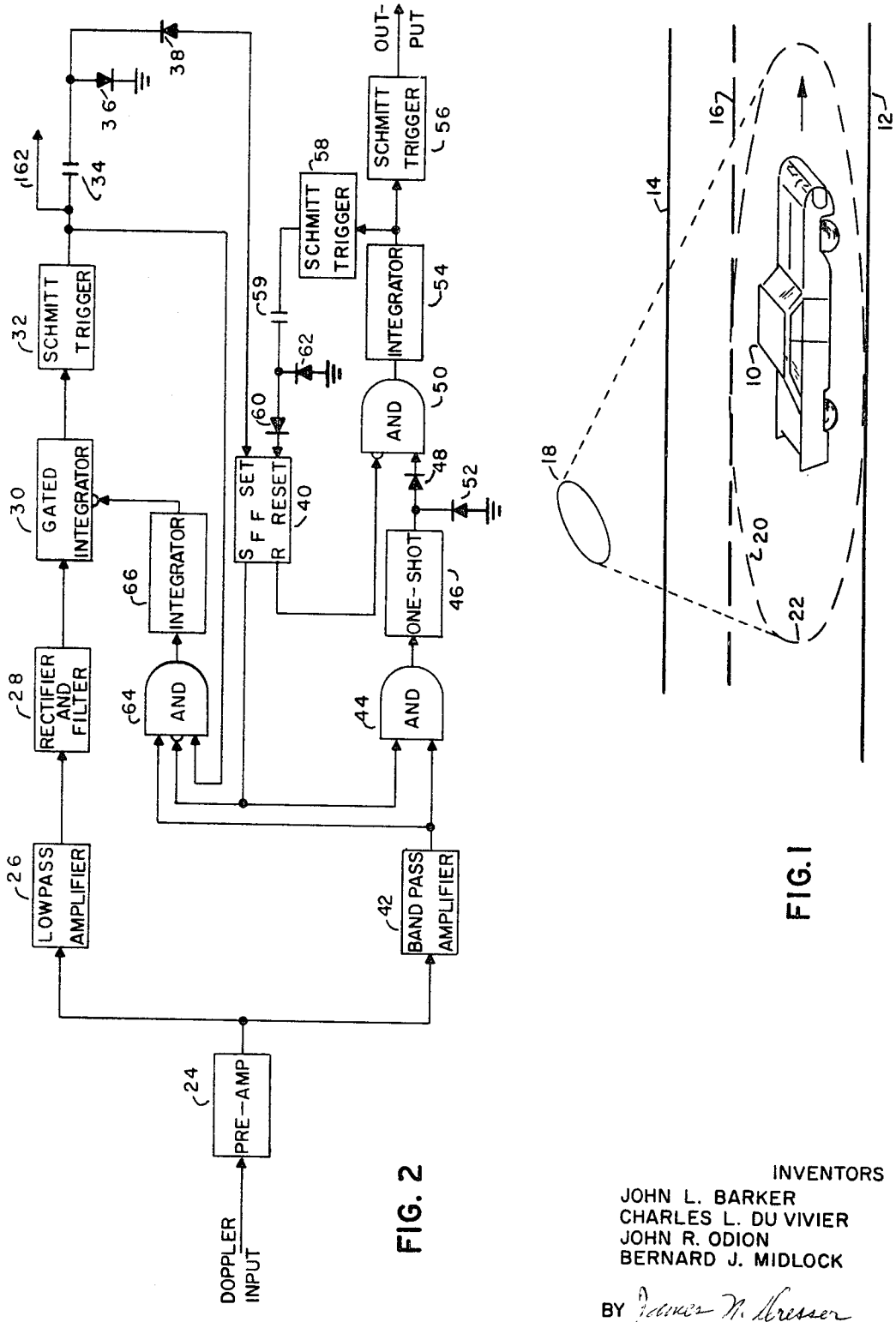
FIGURE 1 is an elevation view of a radar detector antenna, in relation to a roadway with a vehicle thereon, adapted for use as an input detection device for the subject invention.
FIGURE 2 is a block diagram of a preferred form of the subject invention.

Referring to FIGURE 1 in more detail, a vehicle 10 is shown schematically, proceeding toward the right of the figure, as indicated by the arrow, along a roadway which, for example, may have a lane width of thirteen feet. The edges of the roadway are indicated by 12 and 14, with a center line as indicated at 16. Supported over a single lane of the roadway by a pole or other means (not shown) is an ultra-high-frequency radio antenna unit 18. The antenna unit 18 may be any one of a number of types. One particular unit suited for this application is disclosed in U.S. Patent 3,059,232 issued Oct. 16, 1962 to J. L. Barker and assigned to the same assignee as the present invention.

The antenna unit 18 is supported over the side of the roadway on which it is desired to detect passing vehicles and to measure their speed, as, for example, over the right side of a roadway on which traffic drives to the right, as illustrated in FIGURE 1. The antenna unit is mounted with its center axis at an angle with the vertical, for example, an angle of approximately 40°, so that the unit 18 directs a beam of ultra-high-frequency radio waves downward to produce an elliptical pattern 20 on the same side of the roadway as it is mounted, with the long axis of the elliptical pattern substantially parallel to the roadway, and extending from approximately directly under the antenna unit outward toward receding vehicles.

Since the ultra-high-frequency antenna unit 18 is mounted at an angle, it transmits a radio beam downward which is reflected back from vehicle 10, and the reflected energy includes a Doppler frequency shift effect due to the motion of vehicle 10. The ultra-high-frequency energy transmitted by the antenna is derived from an ultra-high-frequency oscillator-detector, and the received Doppler frequency is mixed in this detector to provide a Doppler beat frequency output, in well-known manner. Further details of this Doppler beat frequency output generation are found in the afore-mentioned U.S. Patent 3,059,232 to J. L. Barker.

Since the radiant wave energy from the detection unit 18 is directed downward at an angle toward receding vehicles in a substantially limited pattern as indicated by the ellipse 20 in FIGURE 1, the motion of the vehicle will be at a considerable angle with respect to the radiant energy beam, and consequently the Doppler frequency shift effect produced on the radiant wave energy by the motion of the vehicle will be very much reduced in relation to the vehicle speed along the road. The Doppler frequency shift, and so the Doppler beat frequency output, will be proportional to the vehicle road speed multiplied by the cosine of the angle of this road speed direction with the shortest radial direction to the antenna at each instant of the vehicle passage through the beam. Consequently, the Doppler beat frequency output will vary from a very low frequency, when the vehicle 10 first enters the radiation pattern 20 at the leading edge 22 thereof, to higher frequencies as the vehicle 10 passes further into the pattern 20 away from the unit 18, as for example, the point shown in FIGURE 1.

The Doppler beat frequency signal obtained from the ultra-high-frequency unit is applied as the input to preamplifier 24 shown in FIGURE 2. The output from preamplifier 24 is applied to low-pass amplifier 26 which has an upper frequency limit of approximately 5 to 10 cycles per second. Consequently, amplifier 26 will pass only the low-frequency Doppler beat signal within this frequency range, which is indicative of the detection of the passing vehicle as it enters radiation pattern 20 at leading edge 22.

This low-frequency signal is passed from low-pass amplifier 26 to rectifier and filter unit 28 in which the varying signal is rectified and smoothed to provide a substantially D.C. signal. This smoothed output is then applied to gated integrator 30. The integrator output is connected to Schmitt trigger 32 which has its output connected to the first plate of capacitor 34. The second plate of capacitor 34 is connected to the anode of diode 36, the cathode of which is grounded. The second plate of capacitor 34 is also connected to the cathode of diode 38 which has its anode tied to the set input of bi-stable multivibrator 40.

Assuming for the moment that the gated integrator 30 is not inhibited, the Schmitt trigger 32 generates an output pulse with a duration substantially the same as the duration of the low-frequency detection signals in the Doppler beat frequency signal received by preamplifier 24. Capacitor 34 differentiates this output from the Schmitt trigger, and the resulting positive spike is passed to ground through diode 36. When the detection signals end, and Schmitt trigger 32 turns off, a negative spike appears from the capacitor 34. This negative spike passes through diode 38 to the set input of bi-stable multivibrator or flip-flop 40, causing it to assume its set condition.

The Doppler beat frequency signal from preamplifier 24 is also sent to band-pass amplifier 42 which is designed to pass signals within a frequency band higher than the frequency of the signals passed by low-pass amplifier 26. The lower-frequency limit of band-pass amplifier 42 is in the range of 15 to 20 cycles per second, and its upper-frequency limit is in the range of 350 cycles per second. The output of band-pass amplifier 42 is sent to the first input of AND gate 44, which has its other input connected to the set output of flip-flop 40. Consequently, when flip-flop 40 is in its set condition, each Doppler frequency pulse within the frequency range passed by band-pass amplifier 42 will cause an output from AND gate 44.

The output of AND gate 44 is connected to the input of mono-stable multivibrator 46. The output of mono-stable multivibrator or one-shot 46 will be a series of pulses, one pulse occurring at each pulse of the Doppler frequency in the high-frequency speed signal passed by band-pass amplifier 42. The magnitude and duration of these output pulses from one-shot 46 will, of course, be dependent upon the characteristics of the one-shot, while the repetition rate of the pulses will be dependent upon the Doppler frequency in the speed signal applied to AND gate 44. The positive pulses which occur when one-shot 46 is triggered to its unstable condition pass through diode 48 to the signal input of INHIBITED-AND gate 50, which has its inhibit input tied to the reset output of flip-flop 40. The negative pulses, occurring when one-shot 46 returns to its stable state, are passed to ground through diode 52. The output of INHIBITED-AND gate 50 is connected to the input of integrator 54. The output of integrator 54 is connected to Schmitt trigger 56, which is set to trigger at a low voltage value, for example in the order of 0.2 volt. The output of integrator 54 is also sent to the input of Schmitt trigger 58 which is set to fire at a higher level, for example in the order of 5.0 volts.

Schmitt trigger 56 generates the circuit output signal and is connected to appropriate utilizing and/or indicating equipment (not shown). Schmitt trigger 58 has its output connected to the first plate of capacitor 59. The second plate of capacitor 59 is connected to the anode of diode 60 and to the cathode of diode 62. The cathode of diode 60 is tied to the reset input of flip-flop 40. The anode of diode 62 is tied to ground. Consequently, positive pulses occurring when Schmitt trigger 58 fires are passed through capacitor 59 and diode 60 to the reset input of flip-flop 40, while negative pulses occurring when the Schmitt trigger 58 is shut off are passed to ground through capacitor 59 and diode 62.

The output from band-pass amplifier 42 is also provided as a signal input to INHIBITED-AND gate 64. A second signal input to INHIBITED-AND gate 64 is provided from Schmitt trigger 32 within the low-frequency detection channel. The set output from flip-flop 40 is connected to the inhibit input of INHIBITED-AND gate 64. The output of INHIBITED-AND gate 64 is connected to the input of integrator 66, the output of which is connected to the inhibit input of gated integrator 30 within the low frequency detection channel.

Figure 3:
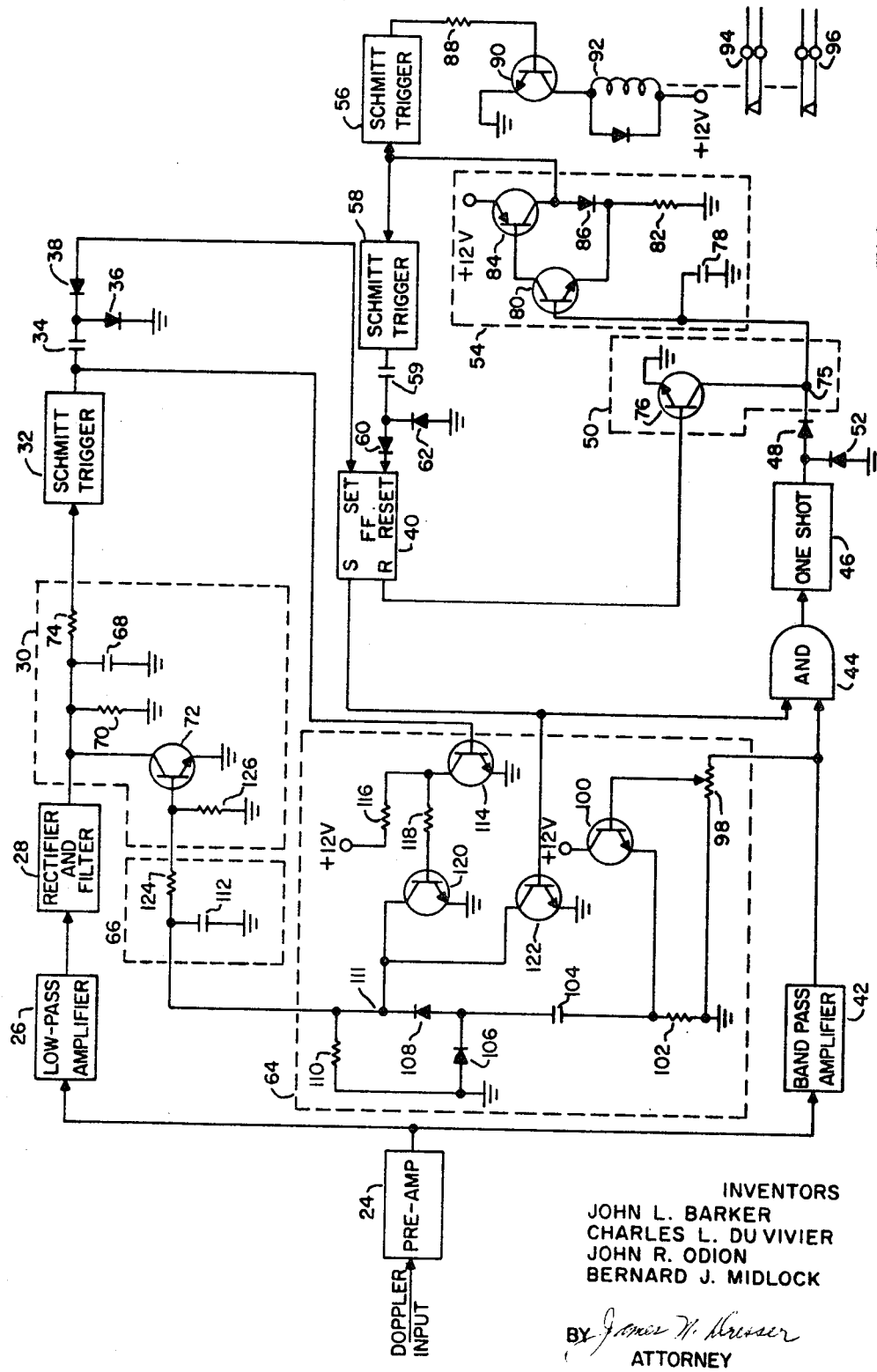
FIGURE 3 is a diagram, partially block and partially schematic, of the same preferred form of the invention.

FIGURE 3 depicts detailed circuitry of preferred embodiments of some of the blocks shown within FIGURE 2. The other blocks of FIGURE 2 are of standard, well-known designs and are repeated in block form in FIGURE 3. Again the Doppler input passes through preamplifier 24, which is of a standard design, and it is applied to low-pass amplifier 26. Amplifier 26 can also be of a standard known design and has an upper-frequency limit in the range of 5 to 10 cycles per second. Preferably, amplifier 26 will include circuitry which will cause it to oscillate or ring for one or two cycles after the input is removed from it. This will cause an output from amplifier 26 for a brief period following each input signal. Therefore the circuit will not miss a short duration input signal, such as might occur as the detection input as a very high speed vehicle passes detector 18. The ringing within amplifier 26 insures that such an input signal will not be lost. One amplifier suitable for this application is disclosed and claimed as feed-back amplifier 60 in U.S. Patent 3,182,312, issued May 4, 1965, to C. K. Daniels, and assigned to the same assignee as the present invention. While the amplifier depicted in the aforesaid Daniels patent is shown as designed to have a band-pass with its peak at 14 cycles per second, proper selection of component values will result in such an amplifier with a band-pass peak having an upper limit in the 5 to 10 cycle-per-second range desired for the present application.

The output from amplifier 26 is applied to standard rectifier filter 28, which has its output connected to one plate of capacitor 68 within gated integrator 30. The second plate of capacitor 68 is tied to ground. The first plate of capacitor 68 is shunted to ground by resistor 70. The output of rectifier filter 28 is also tied within gated integrator 30 to the collector of NPN transistor 72, which has its emitter grounded.

The first plate of capacitor 68 is connected through resistor 74 to the input of Schmitt trigger 32, which is of well-known design. The output of Schmitt trigger 32 passes through capacitor 34 to the cathode of diode 38, the anode of which is connected to the set input of flip-flop 40. The cathode of diode 38 is also connected to the anode of diode 36 which has its cathode tied to ground.

The output of preamplifier 24 is also connected to the input of band-pass amplifier 42 within the high-frequency speed channel. Band-pass amplifier 42 can be of any standard design, and preferably it has a lower limit in the order of 15 to 20 cycles per second and an upper limit in the order of 350 cycles per second. The output from amplifier 42 is applied to one input of AND gate 44 which receives its other input from the set output of flip-flop 40. The output of AND gate 44 is applied to the input of one-shot multivibrator 46 which has its output tied to the anode of diode 48 and to the cathode of diode 52. Diode 48 has its cathode connected to junction 75 within INHIBITED-AND gate 50. Diode 52 has its anode tied to ground.

Junction 75 is connected to the collector of NPN transistor 76 within INHIBITED-AND gate 50. The base of transistor 76 is tied to the reset output of flip-flop 40 to provide the inhibit input to the INHIBITED-AND gate. The emitter of transistor 76 is tied directly to ground.

Junction 75 is tied to the first plate of capacitor 78 within integrator 54. The second plate of capacitor 78 is grounded. The first plate of capacitor 78 is also connected to the base of NPN transistor 80, which has its emitter grounded through resistor 82 and its collector tied to the base of PNP transistor 84. The collector of transistor 84 is connected to the anode of diode 86, which has its cathode tied to the emitter of transistor 80. The emitter of transistor 84 is connected to a source of potential, such as +12 volts D.C. Transistors 80 and 84, together with resistor 82 and diode 86, are thus connected as an impedance converter. Transistor 80 operates essentially as an emitter follower, with transistor 84 and diode 86 bringing the output voltage, taken at the anode of diode 86, closer to the input voltage applied to the base of transistor 80. There is a small voltage drop between the base and the emitter of transistor 80, and this voltage drop is compensated by the forward voltage drop across diode 86. Therefore, the voltage at the anode of diode 86 is very close to the input voltage applied to the base of transistor 80, and thus it is very close to the integrated voltage found on the first plate of capacitor 78.

The anode of diode 86 is connected to the input of Schmitt trigger 56 and to the input of Schmitt trigger 58. Schmitt trigger 56 provides the output signal which can be transmitted to appropriate utilizing circuitry. By way of example, FIGURE 3 shows the output of Schmitt trigger 56 connected through resistor 88 to the base of NPN transistor 90, the emitter of which is tied to ground. The collector of transistor 90 is connected to one side of relay coil 92, the other side of which is connected to a source of potential such as +12 volts D.C. The relay contacts 94 and 96, therefore, provide the output signal from the system. Other output or indicating devices can of course be utilized.

The output of Schmitt trigger 58 connects through capacitor 59 to the cathode of diode 62, the anode of which is grounded. The cathode of diode 62 is connected to the anode of diode 60, the cathode of which is tied to the reset input of flip-flop 40.

The output of band-pass amplifier 42 is connected through the fixed resistance of potentiometer 98 to ground within INHIBITED-AND gate 64. The arm of potentiometer 98 is tied to the base of NPN transistor 100, which has its collector connected directly to a source of potential, such as +12 volts D.C., and its emitter connected through resistor 102 to ground. The emitter of transistor 100 also connects through capacitor 104 to the cathode of diode 106, the anode of which is grounded. The cathode of diode 106 is connected to the anode of diode 108, which has its cathode connected through resistor 110 to ground. The cathode of diode 108 is also connected to junction 111 which then connects to the first plate of capacitor 112 within integrating circuit 66. The second plate of capacitor 112 is tied to ground.

The output of Schmitt trigger 32 within the low-frequency detection channel is connected to the base of NPN transistor 114 within INHIBITED-AND gate 64. Transistor 114 has its emitter grounded and its collector connected through resistor 116 to a source of potential, such as +12 volts D.C. The collector of transistor 114 is also connected through resistor 118 to the base of NPN transistor 120, which has its emitter grounded and its collector tied to junction 111.

The set output of flip-flop 40 is connected to the base of NPN transistor 122 within INHIBITED-AND gate 64. Transistor 122 has its emitter tied to ground and its collector tied to junction 111.

The first plate of capacitor 112 connects through resistor 124 to the base of NPN transistor 72 within gated integrator 30. The base of transistor 72 is also connected to ground through resistor 126.

Operation of the preferred embodiment

When the system of the present invention is in its quiescent condition prior to the passage of a vehicle beneath detector 18, flip-flop 40 is in its reset condition, and so AND gate 44 is prevented from passing signals, and transistor 76 is on, clamping junction 75 to ground. Since there is no input signal, there is no output from low-pass amplifier 26, and so Schmitt trigger 32 is off. As a consequence, transistor 120, within INHIBITED-AND gate 64, is on, clamping junction 111 to ground.

As described in the afore-mentioned U.S. Patent 3,059,-232 to J. L. Barker, the output of detector 18 (FIGURE 1) is a signal including a Doppler frequency resulting from the Doppler frequency shift effect produced on the radiant wave energy by the motion of a vehicle as it passes the detector. This Doppler frequency is proportional to the vehicle road speed multiplied by the cosine of the angle of the vehicle speed direction within the shortest radial distance to the detector at each instant. Consequently, since the antenna is directed at the vehicle as it moves away, after passing under the antenna, the Doppler frequency signal commences at a low-frequency, when the vehicle is directly below the antenna, and increases to higher frequencies, as the vehicle moves away from the detector and the cosine increases.

The Doppler frequency signal, after passage through appropriate amplification and transmission means (not shown) not necessary to an understanding of the present invention, is applied as the input to preamplifier 24.

Although detector 18 is mounted at an angle so that it is directed at vehicles after they have passed the detector, some ultra-high-frequency radiation will exist in the back-lobes of the radiation pattern of detector 18, and this energy will impinge upon the surface of the roadway behind detector 18. When a vehicle approaches detector 18, some of this energy in the detector back-lobes will be reflected back to the detector by the moving vehicle. This reflected energy will, of course, include a Doppler frequency shifted effect indicative of the vehicle speed. The Doppler beat frequency output signal obtained from detector 18 as a result of this effect will pass through preamplifier 24 of FIGURE 2, but it will be blocked by low-pass amplifier 26. This signal will pass through band-pass amplifier 42, after which it will be blocked by AND gate 44, and it will pass through emitter follower 100, and capacitor 104 in INHIBITED-AND gate 64. The negative going signals then pass to ground through diode 106, while the positive going signals pass to ground through diode 108 and transistor 120. Thus, there is no effect on the circuit as a result of the high-frequency signal from the back-lobes of the detector radiation pattern as a vehicle approaches detector 18.

When the vthicle passes beneath detector 18, the Doppler signal will include low frequencies which will pass through both amplifier 26 and amplifier 42. These low-frequency Doppler signals are amplified by low-pass amplifier 26 and are applied to rectifier-filter 28. The output of rectifier-filter 28 is a low-level D.C. voltage which is integrated on capacitor 68. The signals passed by amplifier 42 are still blocked by AND gate 44 and are shunted to ground in INHIBITED-AND gate 64, as before.

When the voltage on capacitor 68 has built up to a suitable level, Schmitt trigger 32 fires and the voltage at its output increases. The charging time of capacitor 68 prevents erroneous firing of Schmitt trigger 32 by brief pulses which may be received due to such things as relay contact bounce. When Schmitt trigger 32 fires, it turns on transistor 114, and so transistor 120 turns off. Consequently, junction 111 is no longer clamped to ground. The Doppler beat frequency pulses, making up the speed signal, pass through emitter follower 100 and capacitor 104, and the negative portions of the pulses are shunted to ground through diode 106. The positive portions of the pulses go through diode 108 to capacitor 112 which serves as a pulse counter. Each pulse applied to capacitor 112 increases the voltage on the capacitor. A little of the voltage on capacitor 112 drains off to ground through resistor 110 between pulses. Thus, the voltage on capacitor 112 is somewhat dependent upon the rate at which pulses are applied to it. This in turn is dependent upon the rate at which the passing vehicle is traveling when it passes detector 18. Pulses are applied to capacitor 112 at a higher rate when a higher speed vehicle passes detector 18, and so the voltage on capacitor 112 builds up faster in such a case than it does when a lower speed vehicle passes detector 18.

The positive output voltage from Schmitt trigger 32 is differentiated by capacitor 34, and the resulting positive going spike is passed to ground through diode 36. As the passing vehicle moves away from the point on the road directly beneath detector 18, the frequency of the Doppler beat frequency signal increases, until ultimately the signal will no longer pass through low-pass amplifier 26. Capacitor 68 then commences to discharge through resistor 70. If the vehicle is traveling at a low speed, few high-frequency Doppler pulses, indicative of the vehicle speed, will go through band-pass amplifier 42, emitter-follower 100, capacitor 104, and diode 108 to be counted by capacitor 112 in integrator 66. Therefore, the voltage on capacitor 112 will not have built up to a high enough level to turn on transistor 72 within gated integrator 30 by the time the capacitor 68 has discharged through resistor 70 to turn off Schmitt trigger 32. However, if the passing vehicle is traveling at a high speed, a greater number of Doppler speed pulses will be counted by capacitor 112, and so it will charge faster. Therefore, transistor 72 will turn on before capacitor 68 has fully discharged through resistor 70, and so the capacitor 68 will complete its discharge through the transistor 72. This insures that the passing vehicle will be at approximately the same distance on the roadway from the point directly beneath detector 18 when Schmitt trigger 32 turns off regardless of the speed of the passing vehicle.

When Schmitt trigger 32 turns off, its output goes negative, and so transistor 114 turns off, turning on transistor 120 to clamp junction 111 to ground. In addition, when Schmitt trigger 32 turns off, a negative going pulse is passed through capacitor 34 and diode 38 to the set input of flip-flop 40, causing the flip-flop to assume its set condition. The set output of flip-flop 40 turns on transistor 122 which places a second path to ground from junction 111. The voltage on capacitor 112 is shunted to ground through transistors 120 and 122, and so transistor 72 turns off.

The set output of flip-flop 40 enables AND gate 44 to pass a pulse to one-shot multivibrator 46 with each pulse of the high-frequency Doppler beat frequency signals, indicative of the vehicle speed. One-shot 46 is designed so that its recovery time is rapid enough to permit it to be triggered by the leading edge of each pulse from AND gate 44. This means that its recovery time must be short enough to permit it to be triggered by the highest frequency signal which is passed by band-pass amplifier 42. Since amplifier 42 has an upper frequency limit of approximately 350 cycles per second, one-shot 46 must be capable of generating output pulses with a repetition rate of at least 350 pulses per second.

The positive pulses occurring when one-shot 46 is triggered to its unstable state are passed by diode 48 to junction 75. Since flip-flop 40 is no longer in its reset condition, transistor 76 is off, and the voltage on junction 75 is applied to capacitor 78 where it is integrated. The negative voltage occurring when one-shot 46 returns to its stable condition is passed to ground through diode 52.

The potential on capacitor 78 is applied to the impedance converter comprising transistors 80 and 84, resistor 82, and diode 86. As explained above, the voltage at the anode of diode 86 very closely equals the voltage on capacitor 78. This voltage on the anode of diode 86 is utilized as the input to Schmitt triggers 56 and 58.

Schmitt trigger 56 is adjusted to fire at a low input voltage, for example, 0.2 volt; thus, it fires very soon after the speed pulses commence the triggering of one-shot 46. Its output provides the circuit output signal which can be applied to utilizing or indicating equipment, and which, by way of example, is shown in FIGURE 3 as turning on transistor 90 to energize relay 92. Schmitt trigger 56 initiates the output pulse after a few pulses have been passed by INHIBITED-AND gate 50 to charge capacitor 78 to a known level. This insures that the output pulse, from which the speed measurement is made, always commences at the same point in the cycle of the Doppler beat frequency signal, rather than commencing at whatever point in the cycle the beat frequency signal has reached when AND gate 44 is enabled. Thus, the system accuracy is increased.

Schmitt trigger 58 is adjusted to fire at a higher voltage, for example, in the range of 5.0 volts. When Schmitt trigger 58 fires, it resets flip-flop 40. This turns on transistor 76, shunting capacitor 78 to ground. When the voltage on capacitor 78 has dropped sufficiently, Schmitt triggers 56 and 58 turn off, and the circuit output signal ends. When flip-flop 40 returns to its reset condition, the enabling input is removed from AND gate 44, and so no more Doppler speed pulses reach one-shot 46. Transistor 122 is also turned off by the resetting of flip-flop 40, and so one of the paths from junction 111 to ground is removed.

Schmitt trigger 56 produces an output during the time required for the voltage on capacitor 78 to build up from the lower level (e.g., 0.2 volt) to the higher level (e.g., 5.0 volts). The size of capacitor 78 and the characteristics of one-shot 46 are selected so that a known number of pulses from one-shot 46 must be applied to capacitor 78 to cause the voltage on it to increase from this lower level to the higher level. Consequently, a known number of Doppler beat frequency speed pulses must be received and passed to AND gate 44 to cause the voltage on capacitor 78 to increase from the firing level of trigger 56 to the firing level of trigger 58. Since the frequency of the Doppler beat frequency pulses is proportional to the speed of the passing vehicle and distance is proportional to speed, the number of Doppler pulses required to cause this voltage rise is proportional to the distance the passing vehicle has traveled during the speed measurement. Therefore, regardless of its speed, the passing vehicle will travel a fixed distance during the time the charge on capacitor 78 is increasing from the firing level of Schmitt trigger 56 to the firing level of Schmitt trigger 58.

FIGURE 4a depicts the pulses 128 which are applied by AND gate 44 to the input of one-shot 46. When AND gate 44 is enabled by flip-flop 40, one pulse 128 occurs at each cycle of the Doppler beat frequency of the speed signal passed by band-pass amplifier 42. The height, width, and repetition rate or frequency of the pulses 128 are dependent upon the characteristics of the Doppler beat frequency speed signal. The output of one-shot 46 is depicted in FIGURE 4b and consists of a series of positive going pulses 130. One voltage pulse 130 occurs for each voltage pulse 128 applied to the input of one-shot 46. However, while the pulses 128 might vary somewhat in duration and height as the Doppler beat frequency signal varies, each pulse 130 is identical. The magnitude and the duration of the pulses 130 are dependent solely upon the characteristics of the one-shot 46 and are independent of the characteristics of the pulses 128. The repetition rate of the pulses 130 is determined by the frequency of the Doppler beat frequency speed signal.

The pulses 130 from one-shot 46 are applied through diode 48 and junction 75 to capacitor 78 where they are integrated. The potential on capacitor 78 increases with each pulse 130, as is shown by wave-form 132 in FIGURE 4c. This voltage 132 increases a small increment with each pulse 130, and, because the pulses 130 are identical, the incremental increase in wave-form 132 caused by each pulse 130 is uniform, not being dependent upon the Doppler beat frequency pulse characteristics.

Figure 4:
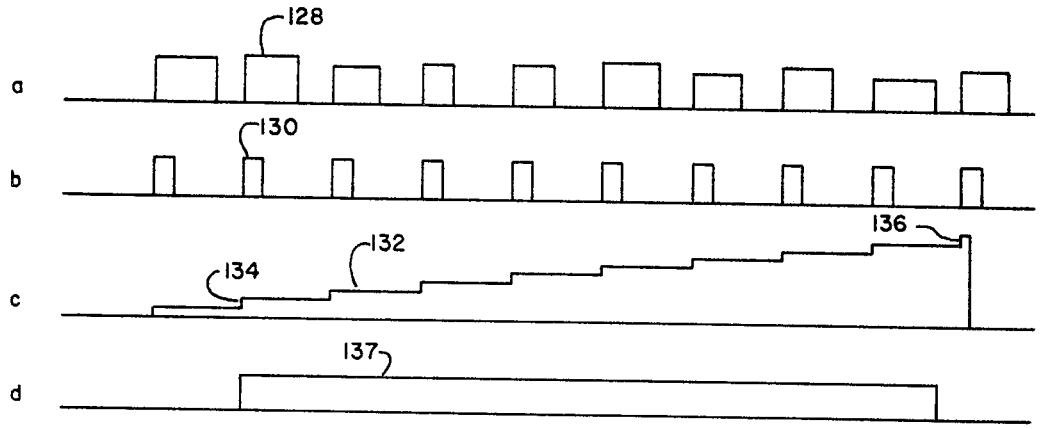
FIGURES 4, 5, and 6 depict wave-forms useful in explaining the operation of this preferred form of the invention.

Schmitt trigger 56 is adjusted to fire at a given potential, for example 0.2 volt, depicted by level 134 in FIGURE 4c. Since the incremental voltage increase caused by each pulse 130 is constant, a fixed number of pulses 130 must be applied to capacitor 78 to build the voltage on the capacitor up to level 134 at which Schmitt trigger 56 fires. Thus in FIGURE 4, it is depicted, by way of example, that two input pulses 128 must be applied to one-shot 46 to cause two pulses 130 from the one-shot, so that the voltage on capacitor 78 will build up to the level 134 to fire Schmitt trigger 56. Further pulses 128 cause more pulses 130 which charge the capacitor 78 until its voltage reaches the firing level of Schmitt trigger 58, depicted by level 136 in FIGURE 4c. Again, a fixed number of pulses 120, shown by way of example in FIGURE 4 as ten pulses, must be applied to capacitor 78 before voltage 132 reaches level 136 to fire Schmitt trigger 58. When Schmitt trigger 58 fires, the circuit is reset, as explained above, and so no more pulses 128 occur.

FIGURE 4d depicts the output pulse 137 from Schmitt trigger 56, which is the circuit output signal applied through transistor 90 to relay 92. This output commences when the voltage 132 on capacitor 78 reaches level 134, turning on Schmitt trigger 56, and the output continues until voltage 132 reaches level 136, turning on Schmitt trigger 58 to reset the circuit.

Figure 5:
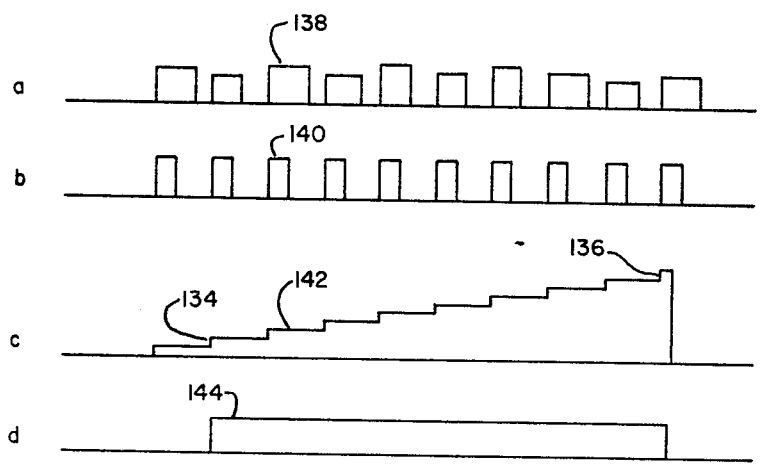

Since the frequency or repetition rate of the pulses 128 is proportional to the speed of the passing vehicle, the duration of the output pulse from Schmitt trigger 56 is inversely proportional to the speed of the vehicle. This is more apparent when the wave-forms of FIGURE 5 are compared with the corresponding FIGURE 4 wave-forms.

FIGURE 5a shows pulses 138 which are applied from AND gate 44 to the input of one-shot 46 when a vehicle passes detector 18 at a speed higher than that illustrated by the wave-forms of FIGURE 4. Since the pulses 138 are caused by a high speed vehicle passing detector 18, these pulses have a higher repetition rate than do the corresponding pulses 128 of FIGURE 4a. Again, the height and width, and repetition rate of the pulses 138 are dependent upon the characteristics of the Doppler beat frequency speed signal. The leading edge of each pulse 138 applied to one-shot 46 causes an output pulse 140, as shown in FIGURE 5b. The pulses 140 have the same magnitude and the same duration as the corresponding pulses 130 of FIGURE 4b, which were caused by the lower speed vehicle. However, the pulses 140 occur more frequently than do the pulses 130 because the pulses 138 have a higher repetition rate or frequency than the pulses 128 due to the vehicle passing faster. The pulses 140 are integrated on capacitor 78, and the resulting voltage 142 of FIGURE 5c is applied via the anode of diode 86 to the inputs of Schmitt triggers 56 and 58. The voltage 142 on capacitor 78 increases a constant incremental amount with each pulse 140. Since the pulses 140 have the same magnitude and duration as the corresponding pulses 130, the incremental increase between adjacent steps in voltage 142 is identical with the incremental increase in the adjacent steps in the voltage 132. The firing level of Schmitt trigger 56 is still set at level 134 in FIGURE 5c, identical with level 134 in FIGURE 4c. Therefore, in this example, Schmitt trigger 56 fires at the second pulse 140, just as it fired at the second pulse 130. However, since the second pulse 140 occurs sooner than did the second pulse 130, the firing level of Schmitt trigger 56 is reached sooner in this higher speed case. Again, the input pulses 138 continue to cause pulses 140 from one-shot 46 which are applied to capacitor 78 until the voltage 142 on the capacitor reaches level 136 at which Schmitt trigger 58 fires. Again, ten pulses 140 are required to bring the voltage 142 to level 136 to fire Schmitt trigger 58. Since the pulses 138 are occurring more rapidly than the corresponding pulses 128, the tenth pulse 140 occurs sooner than did the tenth pulse 130, and so the level 136 is reached sooner in this higher speed case.

The output of Schmitt trigger 56 is again the system output signal, and it is depicted in FIGURE 5d. The output consists of a pulse 144, commencing when voltage 142 on capacitor 78 reaches level 134 at which Schmitt trigger 56 fires, and ending when voltage 142 reaches level 136, at which Schmitt trigger 58 fires. Since the pulses 138 and 140 occur more frequently than do the corresponding pulses 128 and 130, voltage 142 reaches levels 132 and 136 sooner than does voltage 132, and so the output pulse 144 commences sooner and is shorter than the output pulse 137 of the lower speed case. Thus, the duration of the output pulse from Schmitt trigger 56 is inversely proportional with the vehicle speed.

As explained above, INHIBITED-AND gate 64 is unable to pass the Doppler speed pulses from band-pass amplifier 42 to integrator 66 until Schmitt trigger 32 has applied a positive voltage to gate 62. This insures that the Doppler beat frequency signals applied to preamplifier 24 due to reflected energy in the back-lobes of the radiation pattern of detector 18 as a vehicle approaches the detector will not cause integrator 66 to block the passage to capacitor 68 of the low-frequency Doppler beat frequency detection pulses when that vehicle passes beneath detector 18. Therefore, the Doppler detection pulses from that vehicle will not be prevented from actuating Schmitt trigger 32.

Figure 6:
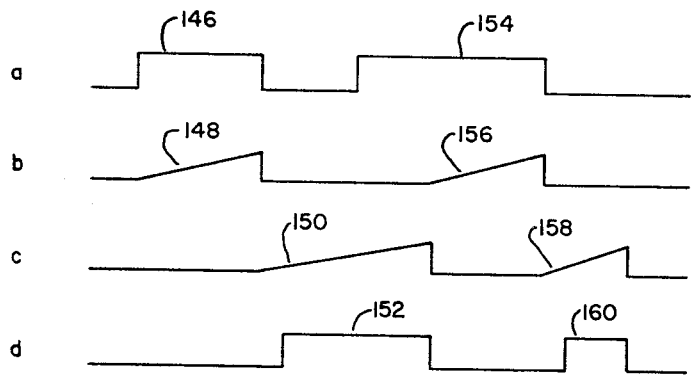

To insure that the Doppler detection pulse from a second, closely-following vehicle will not be missed, IN-HIBITED-AND gate 64 is inhibited by the set output of flip-flop 40 during the time the speed of the first vehicle is being measured. FIGURE 6 depicts wave-forms caused by two closely-spaced vehicles passing beneath detector 18. When the first vehicle passes the detector 18, its Doppler beat frequency detection pulses pass through preamplifier 24 and low-pass amplifier 26 to rectifier and filter 28. The resulting voltage charges capacitor 68 within gated integrator 30, and Schmitt trigger 32 is caused to fire a first time, generating pulse 146 of FIGURE 6a. When trigger 32 fires, INHIBITED-AND gate 64 is enabled to pass Doppler beat frequency speed pulses from band-pass amplifier 42 to capacitor 112 within integrator 66 which receives or counts enough pulses to increase its voltage to turn on transistor 72. As depicted in FIGURE 6b, voltage ramp 148 builds up on capacitor 112 after pulse 146 has been initiated. After the Doppler beat frequency pulses have increased in frequency and are no longer able to pass through low-pass amplifier 26, the voltage on capacitor 68 discharges through resistor 70 and transistor 72. When Schmitt trigger 32 turns off, pulse 146 ends, turning on transistor 120 and setting flip-flop 40. The set output of flip-flop 40 turns on transistor 122, and so transistors 120 and 122 provide parallel paths from capacitor 112 to ground, discharging the capacitor and terminating voltage ramp 148.

When flip-flop 40 is set, AND gate 44 turns on, and transistor 76 within INHIBITED-AND gate 50 turns off. Therefore, at each Doppler speed pulse, one-shot 46 generates a pulse which is applied to capacitor 78 within integrator 54. The voltage on capacitor 78 is depicted as sawtooth pulse 150 in FIGURE 6c, commencing upon the termination of detection pulse 146. Actually, as explained above, this voltage builds up in increments, with each pulse from one-shot 46, as shown in FIGURES 4 and 5. When the voltage on capacitor 112 reaches the firing level of Schmitt trigger 56, the output pulse 152 of FIGURE 6d is initiated. This output pulse 152 continues until Schmitt trigger 58 fires to reset the circuit.

If a second vehicle is closely following the first, a second detection pulse 154 in FIGURE 6a will be initiated by Schmitt trigger 32 before the output pulse 152 of the first vehicle has terminated. Pulse 154 will cause transistor 120 to turn off. If the Doppler speed pulses from bandpass amplifier 42 were permitted to charge capacitor 112, the voltage on capacitor 112 might turn on transistor 72 to terminate detection pulse 154 before output pulse 152 ends. This is particularly true when the second, closely-following vehicle is moving faster than the first. If this were to happen, the circuit would not measure the speed of the second vehicle. To prevent this, transistor 122 prevents the Doppler speed pulses from reaching capacitor 112 by shunting them to ground until output pulse 152 terminates, resetting flip-flop 40. After output pulse 152 ends, the Doppler beat frequency speed pulses are applied to integrator 66 in which the pulses are counted on capacitor 112, and the voltage increases on capacitor 112, as shown by voltage ramp 156 of FIGURE 6b. Upon termination of detection pulse 154, voltage ramp 156 ends, and capacitor 78 again charges, as shown by sawtooth pulse 158 of FIGURE 6c, and a second output pulse 160 of FIGURE 6d is generated, with duration proportional to the speed of the second vehicle.

The gating circuits 44, 50, and 64, together with gated integrator 30, insure accurate operation of the system depicted in the preferred embodiment under heavy traffic conditions even when radiation from the back-lobes of detector 18 is reflected by an approaching vehicle. Thus, this preferred embodiment is suited for general purpose operation in a wide variety of highway applications. Certain of the components can, of course, be eliminated in systems designed for special applications. For example, if the radiation pattern of detector 18 is controlled to prevent the radiation from its back-lobes from reaching the highway, so that no Doppler beat frequency signal will be generated as a car approaches the detector 18 prior to the low-frequency detection pulse, then it will not be necessary to have the output of Schmitt trigger 32 connected to the input of INHIBITED-AND gate 64. Such control of the radiation pattern of detector 18 might be achieved, for example, by careful design practice, by tilting the detector at a great angle to the vertical or by shielding.

Similarly, if the system is to be utilized in an application where closely-spaced vehicles will not be encountered, then it will not be necessary to have the set output of flip-flop 40 connected to the inhibit input of INHIBITED-AND gate 64. If both of the above conditions are present in a particular application, then obviously INHIBITED-AND gate 64 can be entirely eliminated, and the output of band-pass amplifier 42 can be applied to the input of integrator 66, with perhaps an isolation amplifier between them. Other forms of triggering circuits might be utilized in place of Schmitt triggers 32, 56, and 58. For example, a triggering circuit utilizing a uni-junction transistor could be used.

In addition, it is, of course, obvious that while the voltage levels of 0.2 volt and 5.0 volts and the illustrative examples of two and ten Doppler beat frequency pulses from one-shot 46 to capacitor 78 have been given as the firing levels of Schmitt triggers 56 and 58 respectively, these voltage levels and pulse counts are only intended as representative examples, and other suitable voltage levels and pulse counts can be used. The particular firing level of Schmitt triggers 56 and 58 will be selected, along with the characteristics of one-shot multivibrator 46 and integrator 54 so that the output pulse will be of a length which permits a sufficient number of Doppler beat frequency speed pulses to be received from the passing vehicle during the output pulse to insure that the output pulse gives an accurate indication of the vehicle speed. For example, it has been found that a system designed to receive thirty Doppler beat frequency pulses during the output pulse permits the passing vehicle to travel approximately 10 feet. It has been found that an accurate measurement of the vehicle speed can be made in this distance. The distance is not so great that the change in cosine of the angle between the vehicle direction and the shortest radial path between detector 18 and the vehicle path can introduce appreciable error. Since the use of gated integrator 30 insures that the speed measurement commences at the same distance from detector 18 regardless of vehicle speed, the system accuracy has been found to be very great. Other distances than the ten feet and other pulse counts than the thirty can, of course, be utilized in an appropriate system by changing the filing levels of the Schmitt triggers 56 and 58 and by changing the characteristics of one-shot 46 and integrator 54.

The duration of the output pulse from Schmitt trigger 56 is indicative of the speed of the passing vehicle. Traffic volume and density information can be obtained by counting the number of output pulses from Schmitt trigger 56. If a separate output indicating the passage of a vehicle is required for traffic counting, it can be obtained from Schmitt trigger 32, as shown by output line 162 in FIGURE 2. Alternatively, a second output line can be taken from Schmitt trigger 56.

The preferred embodiment has been discussed in connection with an ultra-high-frequency radiation detection device as detector 18. Other devices could be used, for example a sonic Doppler device. It is only required that the detector 18 give a Doppler beat frequency signal with a low-frequency portion indicative of detection of a passing vehicle and a high-frequency portion indicative of the speed of the vehicle.

While the preferred use of this invention is in detecting the passage and speed of vehicles, this may include any type of motor vehicle, train, aircraft, boat, or other moving object. Thus, among others, the several objects of the invention, as specifically aforenoted, are achieved. Although alternate forms of the invention have been pointed out above, obviously numerous other changes in construction and rearrangement might be resorted to without departing from the spirit of the invention and within the scope of the claims.

We claim:

1. Apparatus for determining the speed of a moving object relative to a fixed point comprising detection means at said fixed point for generating a signal having a first portion of pulses with relatively low frequency indicative of the detection of a moving object passing said fixed point and having a second portion of pulses with relatively high frequency indicative of the speed of said moving object relative to said fixed point, first filter means coupled to said detection means to pass said first portion, converting means coupled to said first filter means and adapted to convert said first portion to a voltage pulse, switching means capable of alternatively assuming a first state and a second state, first coupling means coupling said converting means to said switching means to cause said switching means to assume said first state upon the termination of said voltage pulse, second coupling means including second filter means, coupled to said detection means and adapted to pass said second portion, said second filter means having a lower frequency limit greater than said relatively low frequency and having an upper frequency limit, pulse-counting means coupled between said second coupling means and said converting means and adapted to transform said second portion pulses to a voltage ramp to inhibit said converting means from converting said low-frequency portion to a voltage pulse after said voltage ramp has reached a given value, gating means having a first input, a second input, and an output, said first input connected to said second coupling means, said second input connected to said switching means, whereby said gating means first input is connected to said gating means output when said switching means is in said first state, pulse-forming means connected to said gating means output to be activated therefrom, said pulse-forming means adapted to provide upon activation an output pulse of fixed duration, said pulse-forming means having a time constant which permits same to provide output pulses with a repetition rate at least as great as said upper frequency limit, voltage-level-generating means connected to said pulse-forming means and to said switching means for generating a voltage level indicative of the number of said output pulses when said switching means is in said first state, and trigger means connected to said voltage-level-generating means, said trigger means generating a first trigger pulse when said voltage level reaches a first magnitude and generating a second trigger pulse when said voltage level reaches a second magnitude, said trigger means connected to said switching means to cause said switching means to assume said second state upon generation of said second trigger pulse.

2. Apparatus as claimed in claim 1 and including gating means between said second coupling means and said pulse counting means and connected to said converting means to enable passage of said second portion to said pulse counting means only when said voltage pulse is present at said converting means.

3. Apparatus as claimed in claim 1 and including inhibiting means between said second coupling means and said pulse counting means and connected to said switching means to inhibit passage of said second portion to said pulse counting means when said switching means is in said first state.

4. Apparatus as claimed in claim 3 wherein said inhibiting means is connected to said converting means to enable passage of said second portion to said pulse counting means only when said voltage pulse is present at said converting means.

5. Apparatus as claimed in claim 1 wherein said pulse-forming means is a mono-stable multivibrator.

6. Apparatus as claimed in claim 5 wherein said switching means is a bi-stable multivibrator.

7. Apparatus for determining the speed of a vehicle relative to a fixed point comprising radiation detection means at said fixed point for generating a signal having a first portion of pulses with relatively low frequency indicative of the detection of a vehicle passing said fixed point and having a second portion of pulses with relatively high frequency indicative of the speed of said passing vehicle relative to said fixed point, a low-pass filter connected to said detection means to pass said first portion, converting means coupled to said low-pass filter for converting said first portion to a voltage pulse, a bi-stable multivibrator having an input, coupling means coupling said converting means to said bi-stable multivibrator input, said coupling means generating a voltage indication marking the termination of said voltage pulse to cause said bi-stable multivibrator to assume a first stable state, amplification means coupled to said detection means and adapted to pass said second portion, said amplification means including band-pass filter means having a lower frequency limit greater than said relatively low frequency and having an upper frequency limit, inhibiting means including pulse counting means adapted to transform said second portion pulses to a voltage ramp, said inhibiting means connected to said amplification means, said converting means, and said bi-stable multivibrator to inhibit said converting means from converting said first portion to a voltage pulse when all the following conditions exist (a) said bi-stable multivibrator is in said first state (b) said voltage pulse is present at said converting means, and (c) said voltage ramp has reached a pre-set value, a gating circuit having a signal input, an enabling input and an output, said signal input coupled to said amplification means, said enabling input coupled to said bi-stable multivibrator to be energized when said bi-stable multivibrator is in said first state whereby said gating circuit signal input is connected to said gating circuit ouput when said gating circuit enabling input is energized.

a mono-stable multivibrator connected to said gating circuit output to be triggered therefrom, said mono-stable multivibrator providing an output pulse of fixed duration and magnitude in its unstable state, said mono-stable multivibrator having a time constant which permits said mono-stable multivibrator to provide output pulses with a repetition rate at least as great as said upper frequency limit, integrating means connected to said mono-stable multivibrator and to said bi-stable multivibrator for integrating said mono-stable multivibrator ouput pulses when said bi-stable multivibrator is in said first state to produce a voltage level, and trigger means connected to said integrating means, said trigger means generating a first trigger pulse when said voltage level reaches a first magnitude and generating a second trigger pulse when said voltage level reaches a second magnitude, said trigger means connected to said bi-stable multivibrator input to cause said bi-stable multivibrator to assume a second stable state upon generation of said second trigger pulse.

8. A speed sensor comprising input means adapted to receive a Doppler beat frequency signal including a first portion of pulses with relatively low frequency indicative of detection of passing object and including a second portion of pulses with relatively high frequency indicative of the speed of said passing object, first filter means coupled to said input means to pass said first portion, converting means coupled to said first filter means and adapted to convert said first portion to a voltage pulse, switching means capable of alternatively assuming a first state and a second state, first coupling means coupling said converting means to said switching means to cause said switching means to assume said first state upon the termination of said voltage pulse, second coupling means including second filter means, coupled to said input means and adapted to pass said second portion, said second filter means having a lower frequency limit greater than said relatively low frequency and having an upper frequency limit, pulse-counting means coupled between said second coupling means and said converting means and adapted to transform said second portion pulses to a voltage ramp to inhibit said converting means from converting said low frequency portion to a voltage pulse after said voltage ramp has reched a given value, gating means having a first input, a second input, and an output, said first input connected to said second coupling means, said second input connected to said switching means, whereby said gating means first input is connected to said gating means output when said switching means is in said first state, pulse-forming means connected to said gating means output to be activated therefrom, said pulse-forming means adapted to provide upon activation an output pulse of fixed duration, said pulse-forming means having a time constant which permits same to provide output pulses with a repetition rate at least as great as said upper frequency limit, voltage-level-generating means connected to said pulse-forming means and to said switching means for generating a voltage level indicative of the number of said output pulses when said switching means is in said first state, and trigger means connected to said voltage-level-generating means, said trigger means generating a first trigger pulse when said voltage level reaches a first magnitude and generating a second trigger pulse when said voltage level reaches a second magnitude, said trigger means connected to said switching means to cause said switching means to assume said second state upon generation of said second trigger pulse.

9. Apparatus as claimed in claim 8 and including gating means between said second coupling means and said pulse counting means and connected to said converting means to enable passage of said second portion to said pulse counting means only when said voltage pulse is present at said converting means.

10. Apparatus as claimed in claim 8 and including inhibiting means between said second coupling means and said pulse counting means and connected to said switching means to inhibit passage of said second portion to said pulse counting means when said switching means is in said first state.

11. Apparatus as claimed in claim 10 wherein said inhibiting means is connected to said converting means to enable passage of said second portion to said pulse counting means only when said voltage pulse is present at said converting means.

12. Apparatus as claimed in claim 8 wherein said pulse-forming means is a mono-stable multivibrator.

13. Apparatus as claimed in claim 12 wherein said switching means is a bi-stable multivibrator.

14. A speed sensor comprising input means adapted to receive a Doppler beat frequency signal including a first portion of pulses with relatively low frequency and including a second portion of pulses with relatively high frequency, low-pass filter means connected to said input means to pass said first portion, converting means coupled to said low-pass filter means for converting said first portion to a voltage pulse, a bi-stable multivibrator, means coupling said converting means to said bi-stable multivibrator to cause said bi-stable multivibrator to assume a first stable state upon the termination of said voltage pulse, amplification means coupled to said input means and adapted to pass said second portion, said amplification means including band-pass filter means having a lower frequency limit greater than said relatively low frequency and having an upper frequency limit, inhibiting means including
   pulse counting means adapted to transform said second portion pulses to a voltage ramp,
said inhibiting means connected to said amplificaton means, said converting means and said bi-stable multivibrator to inhibit said converting means from converting said first portion to a voltage pulse when all the following conditions exist
   (a) said bi-stable multivibrator is in said first state
   (b) said voltage pulse is present at said converting means, and
   (c) said voltage ramp has reached a pre-set value a gating circuit having a signal input, an enabling input, an output, said signal input coupled to said amplification means, said enabling input coupled to said bi-stable multivibrator to be energized when said bi-stable multivibrator is in said first state whereby said gating circuit signal input is connected to said gating circuit output when said gating circuit enabling input is energized, a mono-stable multivibrator connected to said gating circuit output to be triggered therefrom, said mono-stable multivibrator providing an output pulse of fixed duration and magnitude in its unstable state, said mono-stable multivibrator having a time constant which permits said mono-stable multivibrator to provide output pulses with a repetition rate at least as great as said upper frequency limit, integrating means connected to said mono-stable multivibrator and to said bi-stable multivibrator for integrating said mono-stable multivibrator output pulses when said bi-stable multivibrator is in said first state to produce a voltage level, and trigger means connected to said integrating means, said trigger means generating a first trigger pulse when said voltage level reaches a first magnitude and generating a second trigger pulse when said voltage level reaches a second magnitude, said trigger means connected to said bi-stable multivibrator input to cause said bi-stable multivibrator to assume a second stable state upon generation of said second trigger pulse.

15. Apparatus for determining the speed of a moving object relative to a fixed point comprising
   (a) detection means at said fixed point for generating a signal having a first portion of pulses with relatively low frequency indicative of detection of a moving object passing said fixed point and having a second portion of pulses with relatively high frequency indicative of the speed of said moving object relative to said fixed point;
   (b) first means coupled to said detection means for converting said first portion to a detection pulse;
   (c) second means coupled to said detection means and to said first means and including trigger-pulse-generating means, said trigger-pulse-generating means generating a first trigger pulse following the termination of said detection pulse and generating a second trigger pulse when said moving object has moved a known distance after initiation of said first trigger pulse;
   (d) third means coupled to said first and second means to terminate said detection pulse when said moving object is at substantially a known distance past said detection means; and
   (e) output means coupled to said second means to initiate an output signal upon the generation of said first trigger pulse and to terminate said output pulse upon the generation of said second trigger pulse.

16. Apparatus for determining the speed of a moving object relative to a fixed point comprising
   (a) input means adapted to receive a signal having a first portion of pulses with relatively low frequency indicative of detection of a moving object passing said fixed point and having a second portion of pulses with relatively high frequency indicative of the speed of said moving object relative to said fixed point;
   (b) first means coupled to said input means for converting said first portion to a detection pulse;
   (c) second means coupled to said input means and to said first means and including trigger-pulse-generating means, said trigger-pulse-generating means generating a first trigger pulse following the termination of said detection pulse and generating a second trigger pulse when said second portion pulses indicate said moving object has moved a known distance following initiation of said first trigger pulse;
   (d) third means coupled to said first and second means to terminate said detection pulse when said second portion pulses indicate said moving object is at substantially a known distance past said fixed points; and (e) output means coupled to said second means to initiate an output signal upon the generation of said first trigger pulse and to terminate said output pulse upon the generation of said second trigger pulse.

References Cited

UNITED STATES PATENTS 3,341,848    9/1967    Niediek _____ 340—38 X

RICHARD A. FARLEY, *Primary Examiner.*

C. L. WHITHAM, *Assistant Examiner.*